(No Model.)
A. W. FRANK.
KETTLE COVER.
No. 346,405. Patented July 27, 1886.
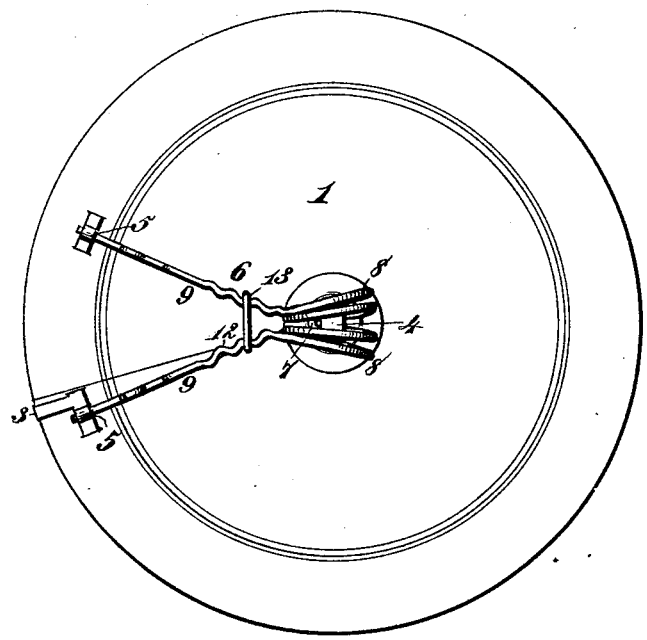
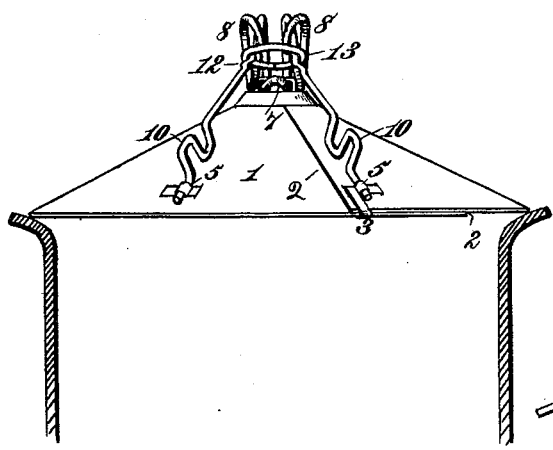
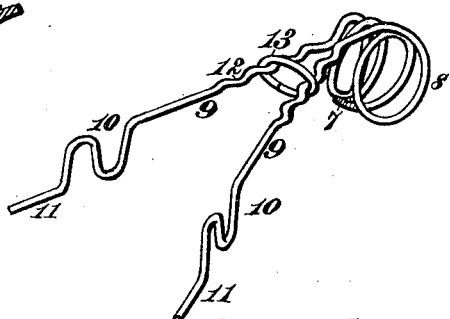
Witnesses
Robert Everett
Dennis Sumby
Inventor
Alonzo W. Frank
By James L. Norris
Atty.

United States Patent Office.

ALONZO W. FRANK, OF BOLIVAR, NEW YORK, ASSIGNOR TO HUGH L. McMULLIN, OF BRADFORD, PENNSYLVANIA.

KETTLE-COVER.

SPECIFICATION forming part of Letters Patent No. 346,405, dated July 27, 1886.

Application filed March 16, 1886. Serial No. 195,438. (No model.)

*To all whom it may concern:*

Be it known that I, ALONZO W. FRANK, a citizen of the United States, residing at Bolivar, in the county of Allegany, and State of New York, have invented new and useful Improvements in Kettle-Covers, of which the following is a specification.

This invention is an adjustable kettle-cover of that class in which a metallic cover is provided with a radial slit extending from center to circumference, a guide being located at the edge of the cover on one side of said slit, for receiving the cover-edge on the opposite side of the slit, whereby the slitted portion of the cover can be made to overlap, so that the cover may be gradually contracted or expanded to fit kettles of various sizes.

My invention consists in the combination, with a radially-slitted cover, of a spring bail or handle engaged with the center of the cover and at points near the circumference thereof, and having crimped arms adjustably connected by a loop, whereby the cover can be contracted or expanded to the desired size and secured in that position, as hereinafter set forth.

In the annexed drawings, illustrating the invention, Figure 1 is a plan view of my improved kettle cover and handle. Fig. 2 is a vertical section of a kettle with cover applied, the cover being shown in elevation. Fig. 3 is a perspective view of my improved spring-cover handle with crimped arms and connecting-loop.

The numeral 1 designates a kettle-cover made of tin plate or similar material, and provided with a radial slit, 2, extending from center to circumference on one side. The edge of the cover on one side of the radial slit 2 is provided with a guide, 3, which receives the opposite portion of the cover and enables one part to overlap and slide on the other without becoming displaced. At the center of the cover on top is a loop or eye, 4, and near the circumference of the cover, on opposite sides of the slit 2, are located smaller loops or eyes 5, one of which is preferably placed near the radial slit 2 and the other at some distance therefrom. A spring bail or handle, 6, is engaged with these eyes 4 and 5, as shown in Fig. 1. The spring-handle 6 consists of a single piece of wire bent into the shape shown in Fig. 3, having its central portion coiled to form a hook, 7, and contiguous springs 8, from which the crimped arms 9 project diagonally. Near the outer ends of the crimped arms 9 the wire is bent up and down reversely, to form bends 10, that serve as a hold for the fingers in drawing said arms together to contract the circumference of the cover. The outer ends of the arms are in contact with the cover and form prongs 11, to engage the outer eyes, 5, while the hooks 7, at the other end of the spring-handle, is engaged with the eye 4 at the center of the cover.

It will be observed that the handle-arms 9 are crimped laterally for a portion of their length, said crimps 12 being adapted to form a series of catches for a loop, 13, by which the arms 9 are held in any desired position, according to the degree of adjustment to be given to the cover. By drawing the crimped arms 9 slightly together, then disengaging the loop 13, pushing it back toward the center of the cover, and releasing the arms, the cover 1 will be enabled to expand sufficiently to fit a kettle of larger size. If it is desired to contract the cover, the arms 9 will be drawn together by pressure of the fingers on the bends or finger-holds 10, and then, by moving the loop 13 outward any desired distance in engagement with the crimps 12, the cover will be secured in a contracted form suitable for fitting a smaller vessel. It will be observed that the edges of the radial slit 2 are always overlapped sufficiently to make a close cover. It will also be observed that the construction of the spring-handle 6, with its crimped arms 9 and loop 13, is such as to afford a ready means of adjustably securing the cover so as to have any diameter desired. At the same time this handle affords a means of raising the cover. It will also be noted that the form of the handle is such that when detached from the cover there is no liability of the loop 13 becoming disconnected, it being prevented from slipping off at one end by the spread of the arms 9, and at the other end by the coils which form the hook 7 and spring 8. I thus provide a simple, cheap, and effective means of adjusting the diameter of a kettle-cover and securing it in the required form and size to correspond with the kettle to which it is to be applied.

What I claim as my invention is—

1. The combination, with an adjustable kettle-cover having a radial slit, of a spring-handle engaged with said cover, and having crimped arms and a loop, whereby the cover can be adjusted and secured to varying diameters, substantially as described.

2. The combination, with an adjustable kettle-cover having a radial slit, and provided at the center and near its circumference with eyes 4 and 5, of a spring-handle engaged with said eyes, and having crimped arms 9 and a connecting-loop, 13, substantially as described.

In testimony whereof I affix my signature in presence of two witnesses.

ALONZO W. FRANK.

Witnesses:
F. A. HULBERT,
H. C. WEILER.